United States Patent [19]
Lucas, Jr. et al.

[11] Patent Number: 5,841,391
[45] Date of Patent: Nov. 24, 1998

[54] COMBINED AIR SURVEILLANCE AND PRECISION APPROACH RADAR SYSTEM

[75] Inventors: Charles D. Lucas, Jr., Newbury Pk; Jeffrey Nemit, Oxnard; Daniel Kikuta, Los Angeles; Gary Kentosh, Bell Canyon, all of Calif.

[73] Assignee: ITT Manufacturing Enterprises, Inc., Wilmington, Del.

[21] Appl. No.: 872,702

[22] Filed: Jun. 11, 1997

[51] Int. Cl.[6] .................................................. G01S 13/93
[52] U.S. Cl. ............................................. 342/34; 342/37
[58] Field of Search ................... 342/33, 34, 36, 342/37

[56] References Cited

U.S. PATENT DOCUMENTS

| | | | |
|---|---|---|---|
| 3,718,988 | 3/1973 | Ball et al. ...................................... | 434/2 |
| 3,900,846 | 8/1975 | Gibbon et al. ............................. | 342/37 |
| 4,910,526 | 3/1990 | Donnangelo et al. ..................... | 342/32 |

OTHER PUBLICATIONS

Brukiewa, T.F., "Active Array Radar systems applied to air traffic control", 1994 IEEE MTT–S International Microwave Symp Digest (Cat. No. 94CH3389–4) Pt. vol. 3, pp. 1427–1432, May 1994.

Primary Examiner—Ian J. Lobo
Attorney, Agent, or Firm—Freilich, Hornbaker & Rosen

[57] ABSTRACT

A radar system which time shares the use of a common radar head to perform functions associated with Air Surveillance Radar (ASR) and Precision Approach Radar (PAR) systems, i.e., for respectively displaying information to an air traffic controller useful for tracking an aircraft's approach to an airport and then guiding said aircraft along a preferred glideslope approach to a runway. In accordance with a significant feature of a preferred embodiment, a common radar head is comprised of an azimuth antenna capable of using radar beams to scan, e.g., electronically, a subsidiary scan arc, i.e., less than ±90°, mounted on a rotational scan apparatus that directs said radar beams within a principal scan arc, a full circle (360°), by continuously rotating, e.g., mechanically, said azimuth antenna at an essentially constant rate. By periodically advancing, preferably electronically, the emission direction of the rotating azimuth antenna, time periods are allocated that can be used to individually permit both ASR and PAR emissions to occur at one or more common rotational positions.

22 Claims, 7 Drawing Sheets

| WF1600 | WF1602 | WF1601 | WF1502 | t=0 .047 .149 .283 .447 sec.

COMBINED AIR SURVEILLANCE AND PRECISION APPROACH RADAR SYSTEM

BACKGROUND OF THE INVENTION

The present invention generally relates to Air Surveillance Radar (ASR) and Precision Approach Radar (PAR) systems useful for tracking aircraft in the vicinity of an airport and guiding aircraft along a preferred glideslope approach to a runway.

Air Surveillance and Precision Approach Radar systems are well known. Typically, once radio contact has been established with an aircraft entering controlled airspace about an airport, an ASR air traffic controller directs the aircraft until it is within the coverage of the Precision Approach Radar at which time the aircraft is handed off by the ASR air traffic controller to a PAR air traffic controller. The PAR air traffic controller then uses the Precision Approach Radar to direct the aircraft during the final approach and landing phase. Typically, the two radar functions, i.e., air surveillance and precision approach, are performed by separate ASR and PAR systems each having its own radar head and control electronics. The performance requirements for the respective radar systems are different and these differences are reflected in the design of the systems. An exemplary specification of performance requirements for typical ASR and PAR systems is contained in the following table:

|  | Air Surveillance Radar (ASR) | Precision Approach Radar (PAR) |
|---|---|---|
| Coverage: | | |
| Range | 20–30 nmi | 9–20 nmi |
| Azimuth | 360° | 20°–30° |
| Elevation | | 7° |
| Altitude | 8000 feet | |
| Renewal Rate: | at least once each 4–5 seconds | at least once each second |
| Accuracy: | | |
| Range | greater of .05R or 150 meters | 30 meters |
| Azimuth | 2° | greater of 0.34° or 9 meters |
| Elevation | | greater of 0.23° or 4.5 meters |
| Resolution: | | |
| Range | greater of .01R or 230 meters | 120 meters |
| Azimuth | 4° | 1.2° |
| Elevation | | 0.6° |

Note that the ASR and PAR performance requirements differ in significant respects. For example, the data renewal rate for the PAR system is once per second (in both azimuth and elevation directions) while the data renewal rate for the ASR system is once each four (4) to five (5) seconds in the azimuth direction with a fixed elevation. Further, the ASR system requires coverage over 360° of azimuth to a range of 20 to 30 nmi (nautical miles) while the PAR system's azimuth coverage requires 20° to 30° to a range of 9 to 20 nmi. Finally, the accuracy and resolution requirements for the PAR are considerably more stringent than those for the ASR. For these and other reasons, it is typical for an airport to employ separate ASR and PAR systems. For example, an ASR system in a typical airport may employ an antenna comprised of one or more S-Band (or L-Band) emitters which scan in azimuth, e.g., by mechanically rotating the antenna at 12 to 15 revolutions per minute (rpm). In contrast, a PAR system may employ an antenna comprised of one or more X-Band emitters which scan in azimuth and elevation, e.g., electronically, at a one (1) second repetition rate.

SUMMARY OF THE INVENTION

The present invention is directed to a radar system characterized by a common antenna for radiating a source beam useful to perform both Air Surveillance Radar (ASR) and Precision Approach Radar (PAR) functions.

More particularly, a system in accordance with the invention is configured to scan a source beam through a 360° azimuth rotation around an airport site located proximate to a runway. During the principal portion of each rotation, the scan rate and source beam characteristics are configured to produce reflected beams appropriate to satisfy typical ASR performance requirements. During a subsidiary portion of each rotation, the scan rate and/or source beam characteristics are modified to produce reflected beams appropriate to satisfy more stringent PAR performance requirements.

A system in accordance with the invention suitable for use at an airport site proximate to a runway for producing data signals representing air surveillance information indicative of aircraft within a 360° azimuth space around said site and precision approach information indicative of the elevation and azimuth of aircraft within a portion of said 360° azimuth space centered on said runway is characterized by: (1) an antenna for directionally radiating a source beam in a first direction and for receiving a reflected beam in response thereto, (2) a principal scan apparatus coupled to said antenna for scanning said source beam radiation at a constant rate through a principal scan rotation corresponding to said 360° azimuth space, (3) a subsidiary scan apparatus coupled to said antenna for varying the direction of said source beam during each said principal scan rotation, (4) a sequence controller for periodically initiating said principal scan and said subsidiary scan within each said principal scan rotation, and (5) a signal generator for applying an air surveillance source signal and a precision approach source signal to said antenna during a selected portion of each said principal scan rotation.

In accordance with a preferred embodiment, the subsidiary scan apparatus periodically advances the source beam direction throughout the principal scan rotation. The source beam signal is retarded for a selected number of portions of the principal scan rotation, to allow a selected number of targets, e.g., 2, to be alternately rescanned using an air surveillance source signal and a precision approach source signal. The responses are then processed to generate data suitable for concurrently driving air surveillance radar (ASR) and a precision approach radar (PAR) displays with a single radar head.

In a further aspect of a preferred embodiment, the principal scan rotation is implemented mechanically, e.g., with a motor. In a still further aspect, the subsidiary scan apparatus is implemented with a plurality of beam emitters whose outputs are controllably phased to form a common source beam. In such an embodiment, the outputs of the beam emitters are collectively controlled to deflect the common source beam.

The novel features of the invention are set forth with particularity in the appended claims. The invention will be best understood from the following description when read in conjunction with the accompanying drawings.

DESCRIPTION OF THE PREFERRED EMBODIMENTS

The present invention is directed to a radar system characterized by a common antenna for radiating a source beam useful to perform both Air Surveillance Radar (ASR) and Precision Approach Radar (PAR) functions.

More particularly, a system in accordance with the invention is configured to scan a source beam through a 360°, azimuth rotation around an airport site located proximate to a runway. During the principal portion of each rotation, the scan rate and source beam characteristics are configured to produce reflected beams appropriate to satisfy typical ASR performance requirements. During a subsidiary portion of each rotation, the scan rate and/or source beam characteristics are modified to produce reflected beams appropriate to satisfy more stringent PAR performance requirements.

In accordance with the invention, a common radar head is comprised of an azimuth antenna which radiates a source beam therefrom in a beam normal direction and principal scan apparatus that scans the source beam through a principal scan arc of 360°, e.g., by continuously rotating said azimuth antenna at an essentially constant rate. Additionally, the beam direction is periodically advanced within a subsidiary scan portion of the principal scan arc in order to allocate time periods that can be used to individually permit both ASR and PAR emissions to occur at one or more common rotational positions. A preferred mechanical embodiment of the common radar head is described in copending application Ser. No. 08/872,899 entitled SELF CALIBRATING RADAR SYSTEM, filed Jun. 11, 1997, the disclosure of which is incorporated herein by reference.

Figure 1:
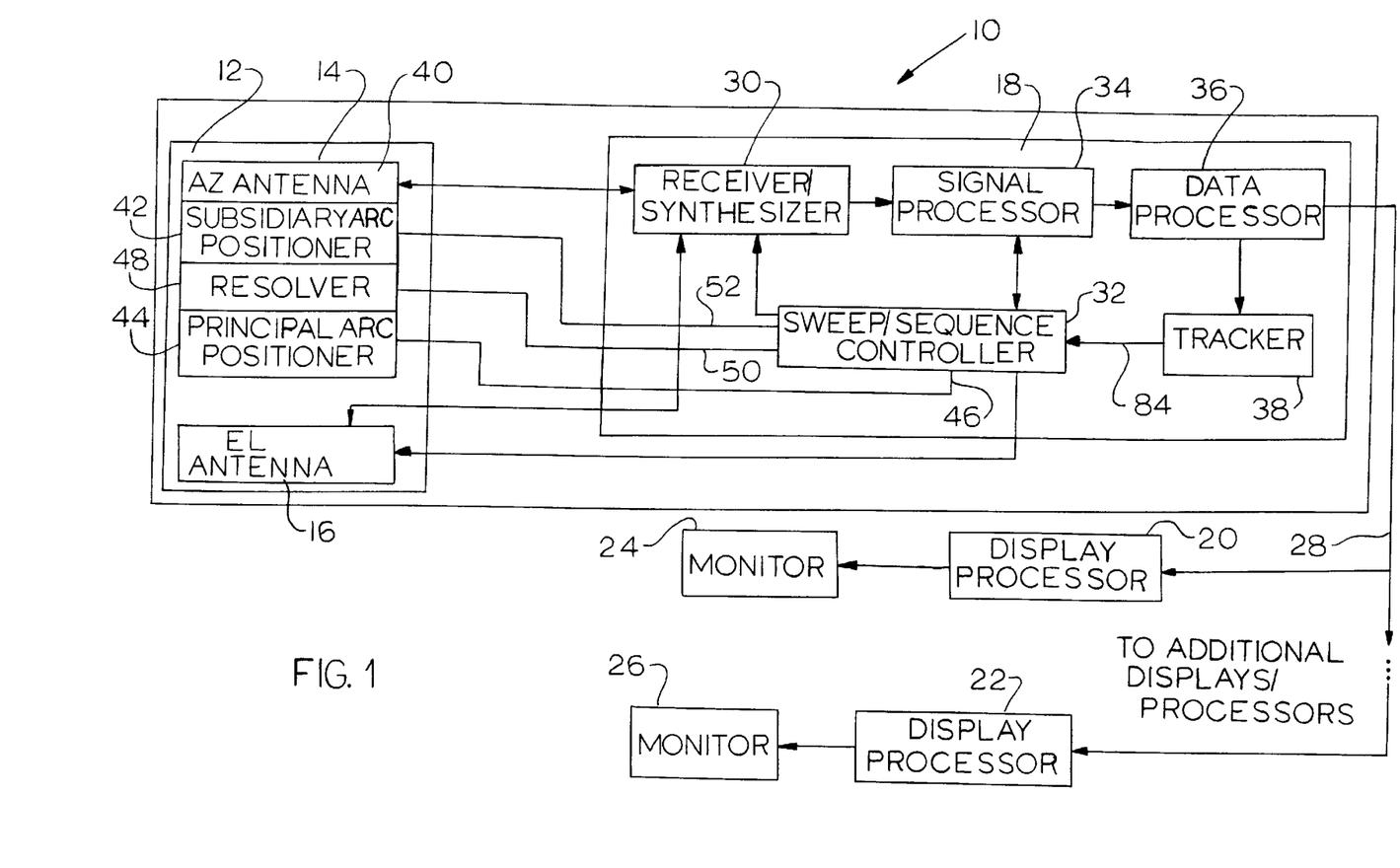
FIG. 1 comprises a top level block diagram of an exemplary embodiment of the present invention primarily showing an azimuth portion of a common radar head for emitting radar beams and retrieving reflected responses suitable for essentially concurrently generating signals suitable for processing in Air Surveillance Radar (ASR) and Precision Approach Radar (PAR) systems.

FIG. 1 is a top level block diagram of an exemplary embodiment of the present invention of a radar system 10 primarily comprised of a common radar head 12 (including azimuth (AZ) 14 and elevation (EL) 16 antennas) located proximate to a prescribed runway landing point for emitting pulsed radar beams and retrieving reflected responses from a reflector (e.g., an aircraft, weather system or obstruction), a radar head controller 18 for controlling effective emission positions of said azimuth 14 and elevation 16 antennas and synchronizing the emissions and processing of responses retrieved from said antennas, and one or more display processors 20, 22 and monitors 24, 26 (optionally remotely located and coupled to the radar head controller 18 via signal path 28) for correspondingly displaying ASR and PAR processed responses. The radar head controller 18 is primarily comprised of a receiver/synthesizer 30 for emitting and receiving a sequence of pulsed source signals, a sweep/sequence controller 32 for synchronizing the effective rotational emission position of the radar head 12, signal 34 and data 36 processors for extracting positional and velocity information from the reflected signals corresponding to obstruction, weather and target, e.g., aircraft data, and a tracker 38 for tracking the position of one or more PAR and ASR targets.

It should be apparent to one of ordinary skill in the art, that the system 10 can readily be used to alternatively function as either an ASR system or a PAR system. If system 10 were to be used as an ASR system alone, the elevation antenna 16 would be unused and the azimuth antenna 14 would be effectively rotated 360°, e.g., mechanically, at an essentially constant rate, typically between 12 to 15 rpm, while emitting radar signals, typically S-band or L-Band. Alternatively, if system 10 were used as a PAR system alone, the elevation antenna 16 would typically scan an 8° arc while the azimuth antenna 14 typically scanned a 20° or 30° arc, both antennas emitting X-band signals and traversing their prescribed arcs once a second. A PAR only embodiment has been described in the U.S. Pat. No. 5,801,658 filed Nov. 22, 1996 of Edwin Howard Reitan, Jr. entitled INTEGRATED PRECISION APPROACH RADAR DISPLAY, the disclosure of which is incorporated herein by reference.

However, embodiments of the present invention additionally include structure to permit timesharing of the azimuth antenna 14 to essentially concurrently perform ASR and PAR functions. In a preferred system 10, the azimuth antenna 14 is comprised of an azimuth emitter 40 having a subsidiary arc positioner 42 which provides the capability of scanning a limited subsidiary scan arc of less than ±90° mounted on a principal arc positioner 44 that continuously effectively rotates, e.g., mechanically via a servo, the azimuth emitter 40 in 360° principal scan arcs (circles) at an essentially constant rate, preferably at essentially 60 rpm. In embodiments of the present invention, the sweep/sequence controller 32 instructs the principal arc positioner 44 via signal path 46 to rotate at the prescribed, e.g., 60 rpm, rate. Additionally, a resolver 48 is preferably coupled to the principal arc positioner 44 to provide a rotational feedback signal via path 50 to the sweep/sequence controller 32. Periodically, the sweep/sequence controller 32, in response to commands from the tracker 38, instructs the subsidiary arc positioner 42 via control signal 52 to alter the position of the azimuth emitter 40 within the subsidiary scan arc. Since the azimuth emitter's rotational position is a function of its controlled, e.g., mechanically, position within the principal scan arc (circle) and the subsidiary scan arc (the limited arc controlled by the subsidiary arc positioner 42), the radar beams emitted from the azimuth emitter 40 can be directed along an essentially discontinuous path by causing the effective rotational position to lead or lag the position defined by the principal arc positioner 44. Consequently, both ASR and PAR radar beams can be emitted at common radial locations during each principal scan arc rotation.

TABLE I

| Principal Sector Position | Subsidiary Sector Position Offset | Δ | Principal + Subsidiary Sector Position Offset = Effective Rotational Position |
|---|---|---|---|
| 0 | 0 | | 0 |
| 1 | 0 | | 1 |
| 2 | 0 | | 2 |
| 3 | 0 | | 3 |
| 4 | 0 | | 4 |
| 5 | 0 | | 5 |
| 6 | 0 | | 6 |
| 7 | 0 | | 7 |
| 8 | 0 | | 8 |
| 9 | 1 | +1 | 10 |
| 10 | 1 | | 11 |
| 11 | 1 | | 12 |
| 12 | 1 | | 13 |
| 13 | 1 | | 14 |
| 14 | 1 | | 15 |
| 15 | 1 | | 16 |
| 16 | 1 | | 17 |
| 17 | 1 | | 18 |
| 18 = 0 | 2 | +1 | 20 |

TABLE II

Target at Sector 4+

| Principal Sector Position | Subsidiary Sector Position Offset | Δ | Principal + Subsidiary Sector Position Offset = Effective Rotational Position |
|---|---|---|---|
| 0 | 0 | | 0 |
| 1 | 0 | | 1 |
| 2 | 0 | | 2 |
| 3 | 0 | | 3 |
| 4 | 0 | | 4 - PAR |
| 5 | 0 | | 5 - PAR |
| 6 | −2 | −2 | 4 |
| 7 | −2 | | 5 |
| 8 | −2 | | 6 |
| 9 | −2 | | 7 |
| 10 | −1 | +1 | 9 |
| 11 | −1 | | 10 |
| 12 | −1 | | 11 |
| 13 | −1 | | 12 |
| 14 | −1 | | 13 |
| 15 | −1 | | 14 |
| 16 | −1 | | 15 |
| 17 | −1 | | 16 |
| 18 = 0 | 0 | +1 | 18 |

The method of accomplishing this task can be best explained in reference to a simplified example shown in Tables I and II above. Table I shows an example in which each 360° principal scan arc (circle) is divided into eighteen (18) rotated, e.g., mechanically, 20° sectors (each allocating a time duration of approximately $\frac{1}{18}$ second at a 1 rpm rotation rate) with sector 18 being equivalent to sector 0 and thus commencing the next principal scan arc (full circle). If the subsidiary arc positioner 42 remained at a central 0°, i.e., beam normal, position, the emitted radar beam would continuously scan the principal scan arc. However, by periodically using the subsidiary arc positioner 42 to advance the emitted radar beam along the subsidiary scan arc, the effective rotational position (principal+subsidiary position) is increased. As shown in Table I, the subsidiary arc positioner offset periodically increases by a sector every 9 sectors. Consequently, at the end of 18 mechanical sectors (360°), there would be an effective rotational position of 20 sectors (400°). In embodiments of the present invention, this effective lead (40° in this example) is used to allocate time periods/sectors to perform PAR scan emissions. In this example, two sectors are used to perform a PAR scan emission corresponding to a single target.

Figure 2:
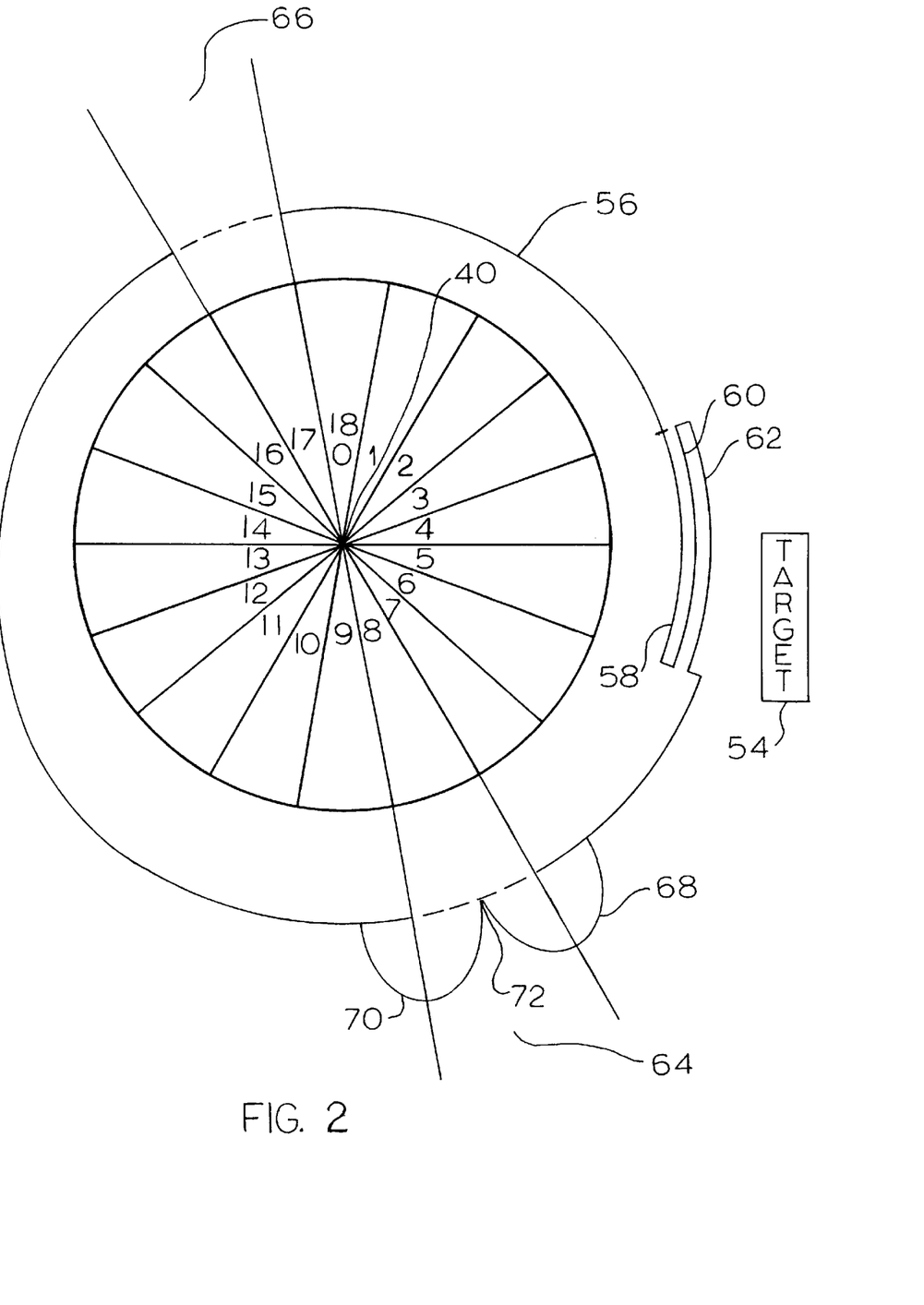
FIG. 2 is a simplified diagram of the scan path of a series of radar beams emitted from said radar head of FIG. 1 showing essentially concurrent emissions of ASR and PAR radar signals.

In FIG. 2 (viewed in conjunction with Table II), a hypothetical target 54 (determined by tracker 38 as discussed further below) is shown located proximate to sector 4. ASR radar beams are emitted from a centrally located azimuth emitter 40 during a first arc portion 56 until sector 4 is reached. Commencing with sector 4 and through sector 5, PAR radar beams are emitted in a second arc portion 58 during the allocated two time periods/sectors. Following sector 5, the subsidiary arc positioner 42 retards (essentially instantaneously relative to its nominal section rotation rate) its current first arc position by two sectors (see path 60). Emissions of ASR radar beams recommence at sector 4. Consequently, the scanning of sectors 4 and 5 (see path 62) overlap with those sectors previously scanned in path 58 in PAR mode. It should be noted that in the present example, the first additional time period does not actually become allocated until the transition between sectors 7 and 9. Consequently, the subsidiary arc positioner 42 causes the azimuth emitter 40 to lag its beam normal position. This will not always be the case and is a function of this particular example. When sector 7 is completed in this example, the subsidiary arc positioner 42 causes the first of its periodic increases. This causes sector 8 to be skipped as the subsidiary arc positioner 42 moves the radar beam one position toward beam normal. Similarly, the subsidiary arc positioner 42 again moves the beam forward at the end of sector 16, skipping sector 17. At this point, the subsidiary arc positioner 42, has returned to its beam normal (0°) position and the process can repeat indefinitely. (see Table III below which demonstrates this process with a PAR target located after the first periodic advance by the subsidiary arc positioner 42.)

TABLE III

Target at Sector 7+

| Principal Sector Position | Subsidiary Sector Position Offset | Δ | Principal + Subsidiary Sector Position Offset = Effective Rotational Position |
|---|---|---|---|
| 0 | 0 | | 0 |
| 1 | 0 | | 1 |
| 2 | 0 | | 2 |
| 3 | 0 | | 3 |
| 4 | 0 | | 4 |
| 5 | 0 | | 5 |
| 6 | 0 | | 6 |
| 7 | 0 | | 7 - PAR |
| 8 | 0 | | 8 - PAR |
| 9 | −2 | −2 | 7 |
| 10 | −1 | +1 | 9 |
| 11 | −1 | | 10 |
| 12 | −1 | | 11 |
| 13 | −1 | | 12 |
| 14 | −1 | | 13 |
| 15 | −1 | | 14 |
| 16 | −1 | | 15 |
| 17 | −1 | | 16 |
| 18 = 0 | 0 | +1 | 18 |

While the sectors required for PAR scanning have been fully covered by the described method, it is notable, that a certain number of ASR sectors, i.e., sectors 8 and 17, have been skipped and thus two 20° gaps (blind spots) 64, 66 exist within the ASR coverage in this example. In contrast, a preferred embodiment addresses these gaps by (1) increasing the number of sectors per rotation and consequently decreasing the sector and gap sizes, e.g., to approximately ¼°, and (2) defining a radar beam width sufficient to overlap sectors and thus provide some coverage to the skipped sectors. Preferably, the sector size and 3 dB beam widths are essentially the same. Consequently, when beam 68 reaches the end of sector 7 and skips over sector 8 to the beginning of sector 9 (beam 70), only a small portion of sector 8 is left uncovered since the 3 dB point 72 of each beam 68, 70 reaches into sector 8.

Optionally, embodiments may periodically alter the absolute rotational positions of the aforementioned gaps by precessing their relative rotational positions. For example, sectors 8 and 17 could be allocated to be skipped during a first rotation, 9 and 18 (i.e., 0) could be allocated to be skipped during a second rotation, 10 and 1 on a third rotation and so on. Alternatively, a pseudorandom number generator could be used to select the allocated gaps for each rotation. Accordingly, the full ASR coverage arc would be covered, albeit at a reduced rate. However, since the ASR coverage arc is updated one a second instead of the required rate of four to five times per second, a preferred embodiment can easily tolerate a periodic gap in its sector coverage.

TABLE IV

Target at Sector 7+

| Principal Sector Position | Subsidiary Sector Position Offset | Δ | Principal + Subsidiary Sector Position Offset = Effective Rotational Position |
|---|---|---|---|
| 0 | 0 |  | 0 |
| 1 | 0 |  | 1 |
| 2 | 0 |  | 2 |
| 3 | 0 |  | 3 |
| 4 | 0 |  | 4 |
| 5 | 0 |  | 5 |
| 6 | 0 |  | 6 |
| 7 | 0 |  | 7 - PAR |
| 8 | 0 |  | 8 - PAR |
| 9 | −2 | −2 | 7 |
| 10 | −2 |  | 8 |
| 11 | −2 |  | 9 |
| 12 | −2 |  | 10 |
| 13 | 0 | +2 | 13 |
| 14 | 0 |  | 14 |
| 15 | 0 |  | 15 |
| 16 | 0 |  | 16 |
| 17 | 0 |  | 17 |
| 18 = 0 | 0 |  | 18 |

In an alternative embodiment, shown above in Table IV, the skipped sectors, e.g., 11 and 12, are contiguously located within each rotation arc. In such an embodiment, the overall gap, i.e., blind spot, size is larger. To accommodate this larger gap, one or more of the aforementioned techniques are preferably used, i.e., the number of gaps per rotation are increased, the beam width of the radar beams are increased, and/or the gap position is periodically precessed, e.g., each rotation.

In a next alternative embodiment, the subsidiary scan can occur at a continuous subsector rate. For example, Table II shows a system where the subsidiary arc positioner 42 causes a periodic movement of one full sector every nine sectors. Alternatively, the subsidiary arc positioner 42 (providing it has sufficient resolution, e.g., it was implemented as an electronically phased array of emitters) could periodically or continuously move at an effective rate of ⅑ of a sector every eight sectors.

Although, the PAR update rate (preferably once per second) is maintained by the described method, the quantity of radar emissions are substantially limited from that of a conventional PAR system which scans a limited, e.g., 20°–30° arc, during each one second period. PAR systems typically emit a sequence of different, e.g., 5, beams, each sensitive to different ranges, velocities and weather conditions. However, embodiments of the present system preferably use the ASR capability and/or the PAR capability of the elevation antenna 16 to locate and select one or more, preferably two, particular targets for PAR tracking. Once the location of the target(s) have been determined and selected by the tracker 38, the PAR radar beam emissions are limited to the optimum signal waveform to detect a selected target at its predetermined position.

In a preferred operation, the sweep/sequence controller 32 receives a feedback signal 50 corresponding to the principal scan arc position from resolver 48 and controls the subsidiary arc positioner 42 to implement the aforedescribed scan sequence. In coordination with the scan sequence, the sweep/sequence controller 32 instructs the receiver/processor 30 via signal processor 34 to emit appropriate ASR and PAR waveforms via the azimuth 14 and elevation 16 antennas. When reflected responses are received by the azimuth 14 and elevation 16 antennas, the receiver/synthesizer 30, signal processor 34 and data processor 36 portions process the responses to localize the position and velocity of targets which reflected the ASR and PAR waveforms. The tracker 38 selects, preferably in association with commands from an operator, at least one target to be tracked and instructs the sweep/sequence controller 32 so that it can centrally emit PAR waveforms corresponding to the current position of the target(s). Preferably, the tracker 38 automatically updates its current predicted position of each target for each sweep. While the simplified examples of Table II–IV, have shown a sequence of two sectors allocated to each tracked target, an exemplary embodiment (described further below) allocates three sectors for each PAR target with the current predicted target location corresponding to the middle sector. Thus, the predicted target location is bracketed by the emitted PAR waveforms.

In Table I, it was shown that the subsidiary sector position offset resulted in an effective rotational position of 400° each rotation, i.e., a rotation of greater than a full circle. Consequently, this additional rotational capability must be used each rotation to do a PAR scan to result in an effective rotation of 360°. Normally, one or more targets (corresponding to this additional rotational capability) have been assigned by the operator to be tracked by the tracker 38. However, this may not always be the case, e.g., no aircraft may currently be within the PAR tracking range. Therefore, one or more default targets are assigned by the tracker 38 when the aircraft targets are not present. Preferably, these default targets are MTI (moving target indication) reflectors, e.g., two, that are located at predefined positions relative to the runway. Consequently, the data processor 36 can process these MTI responses to correlate the reflected responses to the actual physical positions and thus automatically calibrate the reported detection positions.

Figure 3:
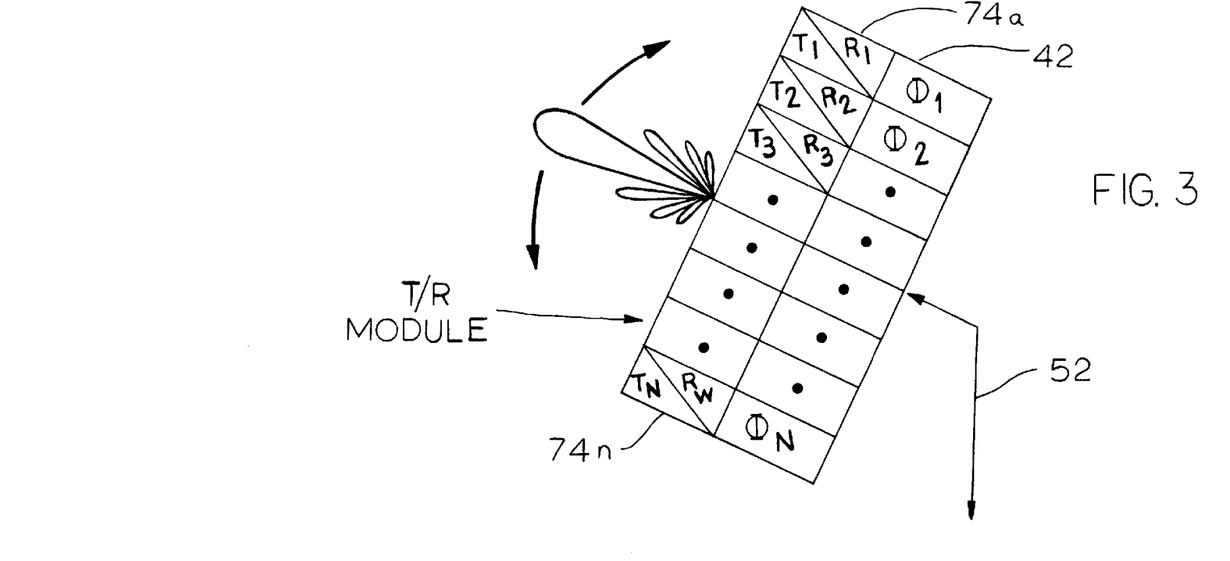
FIG. 3 is a simplified diagram of an antenna comprised of a plurality of emitters whose outputs are phased to generate a resultant scanned radar beam.

The azimuth emitter 40 of the present invention is preferably comprised of a plurality of emitters 74a–74n (see FIG. 3) that have phased outputs that are electronically controlled to direct its microwave signal output to scan through the subsidiary scan arc under control of the sweep/sequence controller 32. However, due to the limited size of the subsidiary scan arc, mechanical or electromechanical, e.g., stepper or servo motors, can also be used to direct the source, e.g., microwave, signals through the subsidiary scan arc.

The emitters and associated drive electronics of the azimuth antenna 14 are chosen to satisfy the PAR X-band emission requirements. Preferably, X-band emissions are used for both the PAR and ASR signal emissions. This design choice also permits simplifications in drive electronics, i.e., the receiver/synthesizer 30 and azimuth 14 and elevation 16 antennas, in that common waveform definitions can be used to generate both the PAR and ASR waveforms. However, an azimuth antenna 14 that used X-band emissions in the PAR mode and S-band or L-band emissions in the ASR mode are also considered within the scope of the present invention.

In a preferred embodiment, X-band emissions are used for both antennas, i.e., the azimuth 14 and elevation 16 antennas. To limit interference between the azimuth 14 and elevation 16 antennas, two methods are used. First, the azimuth antenna emissions are preferably horizontally polarized while the elevation antenna emissions are preferably vertically polarized. Next, it is shown in FIG. 2 that a PAR scan window, e.g., sectors 4 and 5, comprises only a small portion of the rotation of the azimuth antenna 14. Consequently, if the elevation antenna 16 is scanned during portions of the azimuth scan outside of the PAR window, e.g., sectors 9–17, interference can be further reduced.

The following describes an exemplary embodiment of the present invention that implements the previously described features.

Timing and control of the radar system is controlled for two antennas, the azimuth antenna 14 and the elevation antenna 16, at two levels by the sweep/sequence controller 32, i.e., at (1) the scan program level and (2) the waveform level. At the scan program level, a timed sequence of antenna beam positions is coordinated for each antenna and at the waveform level, a timed sequence of pulse transmissions is coordinated for each antenna beam position. The scan program and waveform timing is comprised of the following portions:

azimuth antenna ASR sector partitioning and timing, azimuth antenna ASR waveform sequence timing, azimuth antenna ASR waveforms, elevation antenna PAR scan program and waveforms, and azimuth antenna PAR scan program and waveforms.

TABLE V

ASR Sector Partitioning

| Segment No. | Starting ACP | Starting Mechanical Angle | Starting Electrical Angle | Segment No. | Starting ACP | Starting Mechanical Angle | Starting Electrical Angle |
| --- | --- | --- | --- | --- | --- | --- | --- |
| 0 | 0 | 0.00 | 0.00 | 167 | 18704 | 175.35 | 180.60 |
| 1 | 112 | 1.05 | 1.05 | 168 | 18816 | 176.40 | 181.91 |
| 2 | 224 | 2.10 | 2.10 | 169 | 18928 | 177.45 | 182.96 |
| 3 | 336 | 3.15 | 3.15 | 170 | 19040 | 178.50 | 184.01 |
| 4 | 448 | 4.20 | 4.20 | 171 | 19152 | 179.55 | 185.06 |
| 5 | 560 | 5.25 | 5.25 | 172 | 19264 | 180.60 | 186.11 |
| 6 | 672 | 6.30 | 6.30 | 173 | 19376 | 181.65 | 187.16 |
| 7 | 784 | 7.35 | 7.35 | 174 | 19488 | 182.70 | 188.21 |
| 8 | 896 | 8.40 | 8.66 | 175 | 19600 | 183.75 | 189.26 |
| 9 | 1008 | 9.45 | 9.71 | 176 | 19712 | 184.80 | 190.58 |
| 10 | 1120 | 10.50 | 10.76 | 177 | 19824 | 185.85 | 191.63 |
| 11 | 1232 | 11.55 | 11.81 | 178 | 19936 | 186.90 | 192.68 |
| 12 | 1344 | 12.60 | 12.86 | 179 | 20048 | 187.95 | 193.73 |
| 13 | 1456 | 13.65 | 13.91 | 180 | 20160 | 189.00 | 194.78 |
| 14 | 1568 | 14.70 | 14.96 | 181 | 20272 | 190.05 | 195.83 |
| 15 | 1680 | 15.75 | 16.01 | 182 | 20384 | 191.10 | 196.68 |
| 16 | 1792 | 16.80 | 17.33 | 183 | 20496 | 192.15 | 197.93 |
| 17 | 1904 | 17.85 | 18.38 | 184 | 20608 | 193.20 | 199.24 |
| 18 | 2016 | 18.90 | 19.43 | 185 | 20720 | 194.25 | 200.29 |
| 19 | 2128 | 19.95 | 20.48 | 186 | 20832 | 195.30 | 201.34 |
| 20 | 2240 | 21.00 | 21.53 | 187 | 20944 | 196.35 | 202.39 |
| 21 | 2352 | 22.05 | 22.58 | 188 | 21056 | 197.40 | 203.44 |
| 22 | 2464 | 23.10 | 23.63 | 189 | 21168 | 198.45 | 204.49 |
| 23 | 2576 | 24.15 | 24.68 | 190 | 21280 | 199.50 | 205.54 |
| 24 | 2688 | 25.20 | 25.99 | 191 | 21392 | 200.55 | 206.59 |
| 25 | 2800 | 26.25 | 27.04 | 192 | 21504 | 201.60 | 207.90 |
| 26 | 2912 | 27.30 | 28.09 | 193 | 21616 | 202.65 | 208.95 |
| 27 | 3024 | 28.35 | 29.14 | 194 | 21728 | 203.70 | 210.00 |
| 28 | 3136 | 29.40 | 30.19 | 195 | 21840 | 204.75 | 211.05 |
| 29 | 3248 | 30.45 | 31.24 | 196 | 21952 | 205.80 | 212.10 |
| 30 | 3360 | 31.50 | 32.29 | 197 | 22064 | 206.85 | 213.15 |
| 31 | 3472 | 32.55 | 33.34 | 198 | 22176 | 207.90 | 214.20 |
| 32 | 3584 | 33.60 | 34.65 | 199 | 22288 | 208.95 | 215.25 |
| 33 | 3696 | 34.65 | 35.70 | 200 | 22400 | 210.00 | 216.56 |
| 34 | 3808 | 35.70 | 36.75 | 201 | 22512 | 211.05 | 217.61 |
| 35 | 3920 | 36.75 | 37.80 | 202 | 22624 | 212.10 | 218.66 |
| 36 | 4032 | 37.80 | 38.85 | 203 | 22736 | 213.15 | 219.71 |
| 37 | 4144 | 38.85 | 39.90 | 204 | 22848 | 214.20 | 220.76 |
| 38 | 4256 | 39.90 | 40.95 | 205 | 22960 | 215.25 | 221.81 |
| 39 | 4368 | 40.95 | 42.00 | 206 | 23072 | 216.30 | 222.86 |

TABLE V-continued

ASR Sector Partitioning

| Segment No. | Starting ACP | Starting Mechanical Angle | Starting Electrical Angle | Segment No. | Starting ACP | Starting Mechanical Angle | Starting Electrical Angle |
|---|---|---|---|---|---|---|---|
| 40 | 4480 | 42.00 | 43.31 | 207 | 23184 | 217.35 | 223.91 |
| 41 | 4592 | 43.05 | 44.36 | 208 | 23296 | 218.40 | 225.23 |
| 42 | 4704 | 44.10 | 45.41 | 209 | 23408 | 219.45 | 226.28 |
| 43 | 4816 | 45.15 | 46.46 | 210 | 23520 | 220.50 | 227.33 |
| 44 | 4928 | 46.20 | 47.51 | 211 | 23632 | 221.55 | 228.38 |
| 45 | 5040 | 47.25 | 48.56 | 212 | 23744 | 222.60 | 229.43 |
| 46 | 5152 | 48.30 | 49.61 | 213 | 23856 | 223.65 | 230.48 |
| 47 | 5264 | 49.35 | 50.66 | 214 | 23968 | 224.70 | 231.53 |
| 48 | 5376 | 50.40 | 51.98 | 215 | 24080 | 225.75 | 232.58 |
| 49 | 5488 | 51.45 | 53.03 | 216 | 24192 | 226.80 | 233.89 |
| 50 | 5600 | 52.50 | 54.08 | 217 | 24304 | 227.85 | 234.94 |
| 51 | 5712 | 53.55 | 55.13 | 218 | 24416 | 228.90 | 235.99 |
| 52 | 5824 | 54.60 | 56.18 | 219 | 24528 | 229.95 | 237.04 |
| 53 | 5936 | 55.65 | 57.23 | 220 | 24640 | 231.00 | 238.09 |
| 54 | 6048 | 56.70 | 58.28 | 221 | 24752 | 232.05 | 239.14 |
| 55 | 6160 | 57.75 | 59.33 | 222 | 24864 | 233.10 | 240.19 |
| 56 | 6272 | 58.80 | 60.64 | 223 | 24976 | 234.15 | 241.24 |
| 57 | 6384 | 59.85 | 61.69 | 224 | 25088 | 235.20 | 242.55 |
| 58 | 6496 | 60.90 | 62.74 | 225 | 25200 | 236.25 | 243.60 |
| 59 | 6608 | 61.95 | 63.79 | 226 | 25312 | 237.30 | 244.65 |
| 60 | 6720 | 63.00 | 64.84 | 227 | 25424 | 238.35 | 245.70 |
| 61 | 6832 | 64.05 | 65.89 | 228 | 25536 | 239.40 | 246.75 |
| 62 | 6944 | 65.10 | 66.94 | 229 | 25648 | 240.45 | 247.80 |
| 63 | 7056 | 66.15 | 67.99 | 230 | 25760 | 241.50 | 248.85 |
| 64 | 7168 | 67.20 | 69.30 | 231 | 25872 | 242.55 | 249.90 |
| 65 | 7280 | 68.25 | 70.35 | 232 | 25984 | 243.60 | 251.21 |
| 66 | 7392 | 69.30 | 71.40 | 233 | 26096 | 244.65 | 252.26 |
| 67 | 7504 | 70.35 | 72.45 | 234 | 26208 | 245.70 | 253.31 |
| 68 | 7616 | 71.40 | 73.50 | 235 | 26320 | 246.75 | 254.36 |
| 69 | 7728 | 72.45 | 74.55 | 236 | 26432 | 247.80 | 255.41 |
| 70 | 7840 | 73.50 | 75.60 | 237 | 26544 | 248.85 | 256.46 |
| 71 | 7952 | 74.55 | 76.65 | 238 | 26656 | 249.90 | 257.51 |
| 72 | 8064 | 75.60 | 77.96 | 239 | 26768 | 250.95 | 258.56 |
| 73 | 8176 | 76.65 | 79.01 | 240 | 26880 | 252.00 | 259.88 |
| 74 | 8288 | 77.70 | 80.06 | 241 | 26992 | 253.05 | 260.93 |
| 75 | 8400 | 78.75 | 81.11 | 242 | 27104 | 254.10 | 261.98 |
| 76 | 8512 | 79.80 | 82.16 | 243 | 27216 | 255.15 | 263.03 |
| 77 | 8624 | 80.85 | 83.21 | 244 | 27328 | 256.20 | 264.08 |
| 78 | 8736 | 81.90 | 84.26 | 245 | 27440 | 257.25 | 265.13 |
| 79 | 8848 | 82.95 | 85.31 | 246 | 27552 | 258.30 | 266.18 |
| 80 | 8960 | 84.00 | 86.63 | 247 | 27664 | 259.35 | 267.23 |
| 81 | 9072 | 85.05 | 87.68 | 248 | 27776 | 260.40 | 268.54 |
| 82 | 9184 | 86.10 | 88.73 | 249 | 27888 | 261.45 | 269.59 |
| 83 | 9296 | 87.15 | 89.78 | 250 | 28000 | 262.50 | 270.64 |
| 84 | 9408 | 88.20 | 90.83 | 251 | 28112 | 263.55 | 271.69 |
| 85 | 9520 | 89.25 | 91.88 | 252 | 28224 | 264.60 | 272.74 |
| 86 | 9632 | 90.30 | 92.93 | 253 | 28336 | 265.65 | 273.79 |
| 87 | 9744 | 91.35 | 93.98 | 254 | 28448 | 266.70 | 274.84 |
| 88 | 9856 | 92.40 | 95.29 | 255 | 28560 | 267.75 | 275.89 |
| 89 | 9968 | 93.45 | 96.34 | 256 | 28672 | 268.80 | 277.20 |
| 90 | 10080 | 94.50 | 97.39 | 257 | 28784 | 269.85 | 278.25 |
| 91 | 10192 | 95.55 | 98.44 | 258 | 28896 | 270.90 | 279.30 |
| 92 | 10304 | 96.60 | 99.49 | 259 | 29008 | 271.95 | 280.35 |
| 93 | 10416 | 97.65 | 100.54 | 260 | 29120 | 273.00 | 281.40 |
| 94 | 10528 | 98.70 | 101.59 | 261 | 29232 | 274.05 | 282.45 |
| 95 | 10640 | 99.75 | 102.64 | 262 | 29344 | 275.10 | 283.50 |
| 96 | 10752 | 100.80 | 103.95 | 263 | 29456 | 276.15 | 284.55 |
| 97 | 10864 | 101.85 | 105.00 | 264 | 29568 | 277.20 | 285.86 |
| 98 | 10976 | 102.90 | 106.05 | 265 | 29680 | 278.25 | 286.91 |
| 99 | 11088 | 103.95 | 107.10 | 266 | 29792 | 279.30 | 287.96 |
| 100 | 11200 | 105.00 | 108.15 | 267 | 29904 | 280.35 | 289.01 |
| 101 | 11312 | 106.05 | 109.20 | 268 | 30016 | 281.40 | 290.06 |
| 102 | 11424 | 107.10 | 110.25 | 269 | 30128 | 282.45 | 291.11 |
| 103 | 11536 | 108.15 | 111.30 | 270 | 30240 | 283.50 | 292.16 |
| 104 | 11648 | 109.20 | 112.61 | 271 | 30352 | 284.55 | 293.21 |
| 105 | 11760 | 110.25 | 113.66 | 272 | 30464 | 285.60 | 294.53 |
| 106 | 11872 | 111.30 | 114.71 | 273 | 30576 | 286.65 | 295.58 |
| 107 | 11984 | 112.35 | 115.76 | 274 | 30688 | 287.70 | 296.63 |
| 108 | 12096 | 113.40 | 116.81 | 275 | 30800 | 288.75 | 297.68 |
| 109 | 12208 | 114.45 | 117.86 | 276 | 30912 | 289.80 | 298.73 |
| 110 | 12320 | 115.50 | 118.91 | 277 | 31024 | 290.85 | 299.78 |
| 111 | 12432 | 116.55 | 119.96 | 278 | 31136 | 291.90 | 300.83 |
| 112 | 12544 | 117.60 | 121.28 | 279 | 31248 | 292.95 | 301.88 |

TABLE V-continued

ASR Sector Partitioning

| Segment No. | Starting ACP | Starting Mechanical Angle | Starting Electrical Angle | Segment No. | Starting ACP | Starting Mechanical Angle | Starting Electrical Angle |
|---|---|---|---|---|---|---|---|
| 113 | 12656 | 118.65 | 122.33 | 280 | 31360 | 294.00 | 303.19 |
| 114 | 12768 | 119.70 | 123.38 | 281 | 31472 | 295.05 | 304.24 |
| 115 | 12880 | 120.75 | 124.43 | 282 | 31584 | 296.10 | 305.29 |
| 116 | 12992 | 121.80 | 125.48 | 283 | 31696 | 297.15 | 306.34 |
| 117 | 13104 | 122.85 | 126.53 | 284 | 31808 | 298.20 | 307.39 |
| 118 | 13216 | 123.90 | 127.58 | 285 | 31920 | 299.25 | 308.44 |
| 119 | 13328 | 124.95 | 128.63 | 286 | 32032 | 300.30 | 309.49 |
| 120 | 13440 | 126.00 | 129.94 | 287 | 32144 | 301.35 | 310.54 |
| 121 | 13552 | 127.05 | 130.99 | 288 | 32256 | 302.40 | 311.85 |
| 122 | 13664 | 128.10 | 132.04 | 289 | 32368 | 303.45 | 312.90 |
| 123 | 13776 | 129.15 | 133.09 | 290 | 32480 | 304.50 | 313.95 |
| 124 | 13888 | 130.20 | 134.14 | 291 | 32592 | 305.55 | 315.00 |
| 125 | 14000 | 131.25 | 135.19 | 292 | 32704 | 306.60 | 316.05 |
| 126 | 14112 | 132.30 | 136.24 | 293 | 32816 | 307.65 | 317.10 |
| 127 | 14224 | 133.35 | 137.29 | 294 | 32928 | 308.70 | 318.15 |
| 128 | 14336 | 134.40 | 138.60 | 295 | 33040 | 309.75 | 319.20 |
| 129 | 14448 | 135.45 | 139.65 | 296 | 33152 | 310.80 | 320.51 |
| 130 | 14560 | 136.50 | 140.70 | 297 | 33264 | 311.85 | 321.56 |
| 131 | 14672 | 137.55 | 141.75 | 298 | 33376 | 312.90 | 322.61 |
| 132 | 14784 | 138.60 | 142.80 | 299 | 33488 | 313.95 | 323.66 |
| 133 | 14896 | 139.65 | 143.85 | 300 | 33600 | 315.00 | 324.71 |
| 134 | 15008 | 140.70 | 144.90 | 301 | 33712 | 316.05 | 325.76 |
| 135 | 15120 | 141.75 | 145.95 | 302 | 33824 | 317.10 | 326.81 |
| 136 | 15232 | 142.80 | 147.26 | 303 | 33936 | 318.15 | 327.86 |
| 137 | 15344 | 143.85 | 148.31 | 304 | 34048 | 319.20 | 329.18 |
| 138 | 15456 | 144.90 | 149.36 | 305 | 34160 | 320.25 | 330.23 |
| 139 | 15568 | 145.95 | 150.41 | 306 | 34272 | 321.30 | 331.28 |
| 140 | 15680 | 147.00 | 151.46 | 307 | 34384 | 322.35 | 332.33 |
| 141 | 15792 | 148.05 | 152.51 | 308 | 34496 | 323.40 | 333.38 |
| 142 | 15904 | 149.10 | 153.56 | 309 | 34608 | 324.45 | 334.43 |
| 143 | 16016 | 150.15 | 154.61 | 310 | 34720 | 325.50 | 335.48 |
| 144 | 16128 | 151.20 | 155.93 | 311 | 34832 | 326.55 | 336.53 |
| 145 | 16240 | 152.25 | 156.98 | 312 | 34944 | 327.60 | 337.84 |
| 146 | 16352 | 153.30 | 158.03 | 313 | 35056 | 328.65 | 338.89 |
| 147 | 16464 | 154.35 | 159.08 | 314 | 35168 | 329.70 | 339.94 |
| 148 | 16576 | 155.40 | 160.13 | 315 | 35280 | 330.75 | 340.99 |
| 149 | 16688 | 156.45 | 161.18 | 316 | 35392 | 331.80 | 342.04 |
| 150 | 16800 | 157.50 | 162.23 | 317 | 35504 | 332.85 | 343.09 |
| 151 | 16912 | 158.55 | 163.28 | 318 | 35618 | 333.90 | 344.14 |
| 152 | 17024 | 159.60 | 164.59 | 319 | 35728 | 334.95 | 345.19 |
| 153 | 17136 | 160.65 | 165.64 | 320 | 35840 | 336.00 | 346.50 |
| 154 | 17248 | 161.70 | 166.69 | 321 | 35952 | 337.05 | 347.55 |
| 155 | 17360 | 162.75 | 167.74 | 322 | 36064 | 338.10 | 348.60 |
| 156 | 17472 | 163.80 | 168.79 | 323 | 36176 | 339.15 | 349.65 |
| 157 | 17584 | 164.85 | 169.84 | 324 | 36288 | 340.20 | 350.70 |
| 158 | 17696 | 165.90 | 170.89 | 325 | 36400 | 341.25 | 351.75 |
| 159 | 17808 | 166.95 | 171.94 | 326 | 36512 | 342.30 | 352.80 |
| 160 | 17920 | 168.00 | 173.25 | 327 | 36624 | 343.35 | 353.85 |
| 161 | 18032 | 169.05 | 174.30 | 328 | 36736 | 344.40 | 355.16 |
| 162 | 18144 | 170.10 | 175.35 | 329 | 36848 | 345.45 | 356.21 |
| 163 | 18256 | 171.15 | 176.40 | 330 | 36960 | 346.50 | 357.26 |
| 164 | 18368 | 172.20 | 177.45 | 331 | 37072 | 347.55 | 358.31 |
| 165 | 18480 | 173.25 | 178.50 | 332 | 37184 | 348.60 | 359.36 |
| 166 | 18592 | 174.30 | 179.55 | 333 | 37296 | 349.65 | 360.41 |
| Available Sector Time: Slot #1 >> | | | | 334 | 37408 | 350.70 | 361.46 |
| Available Sector Time: Slot #2 >> | | | | 335 | 37520 | 351.75 | 362.51 |
| Available Sector Time: Slot #3 >> | | | | 336 | 37632 | 352.80 | 363.83 |
| Available Sector Time: Slot #4 >> | | | | 337 | 37744 | 353.85 | 364.88 |
| Available Sector Time: Slot #5 >> | | | | 338 | 37856 | 354.90 | 365.93 |
| Available Sector Time: Slot #6 >> | | | | 339 | 37968 | 355.95 | 366.98 |
| Available Sector Time: Slot #7 >> | | | | 340 | 38080 | 357.00 | 368.03 |
| Available Sector Time: Slot #8 >> | | | | 341 | 38192 | 358.05 | 369.08 |
| Extended Sector Contains 208 ACA >> | | | | 342 | 38400 | 360.0 | 371.08 |

The azimuth antenna ASR sector partitioning and timing is given above in Table V. The 360° of mechanical rotation of the azimuth antenna 14 is partitioned into 342 azimuth sectors using a total of 38,400 azimuth change pulses (ACPs) corresponding to the output 50 of the resolver 48. Sectors 1 through 341 each contain 112 ACPs while sector 342 is larger and contains an additional 96 pulses for a sector total of 208 ACPs. The angular size of a typical sector (112 ACPs) is 112/38400×360°=1.05°. While the angular size of a sector is fixed by its ACP count, the time during which the azimuth antenna beam normal (0°) is in that sector is a function of the ACP count and the principal arc rotation rate of the azimuth antenna 14. At a rotation rate of 60 rpm, sector time 1 through sector time 341 are each 0.0029167 seconds in duration and sector time 342 which contains 208 ACPs is 0.0054167 seconds in duration. Of the 342 sector times, 334 sector times are allocated to the ASR azimuth scan program and 8 sector times are allocated to the PAR azimuth scan program as discussed further below. If the azimuth beam were to remain at beam normal during the first 334 sector times, a mechanical angle of 334×1.05°=350.7° would be scanned by the azimuth antenna 14 as it rotates from sector 1 through sector 334. To increase the total azimuth scan angle to at least 360° during a single rotation using only 334 sector times, the azimuth antenna beam is additionally scanned ahead by 0.2625° every eight sectors using the subsidiary arc positioner 42. Since there are 41 whole groups of 8 sectors each within the 334 sector times, the beam is electronically advanced (scanned) an additional 10.7625° during the time required to scan 350.7° for a total scan angle (mechanical+electronic) of 361.4625° during each rotation period. Thus, this sector time allocation, in addition to scanning 360° of azimuth each rotation for ASR coverage, allows a total in excess of eight sector times each rotation period for tracking up to two designated PAR targets in azimuth (with 3+ sector times allocated to each PAR target). In order to maintain the one second data refresh rate required for the PAR azimuth targets, the azimuth antenna's principal arc rotation occurs at approximately 60 rpm.

Figure 4:
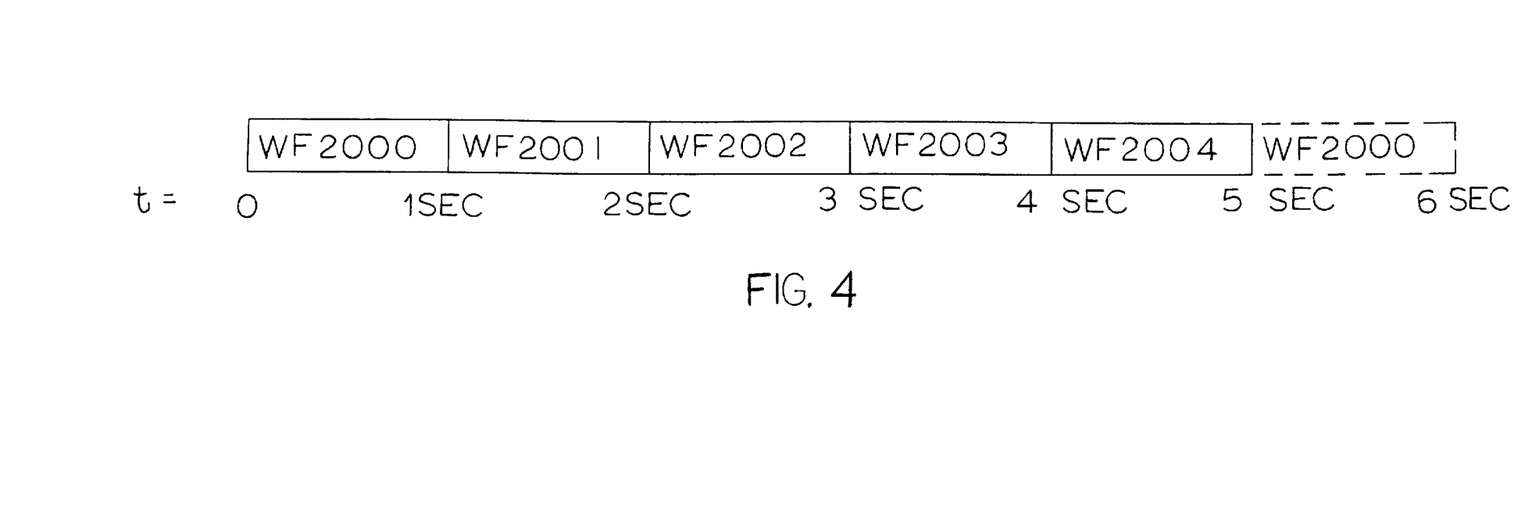
FIG. 4 is simplified timing diagram showing that a different ASR waveform (selected from a set of five waveforms) is emitted during each principal arc rotation in an exemplary embodiment.
Figure 5:
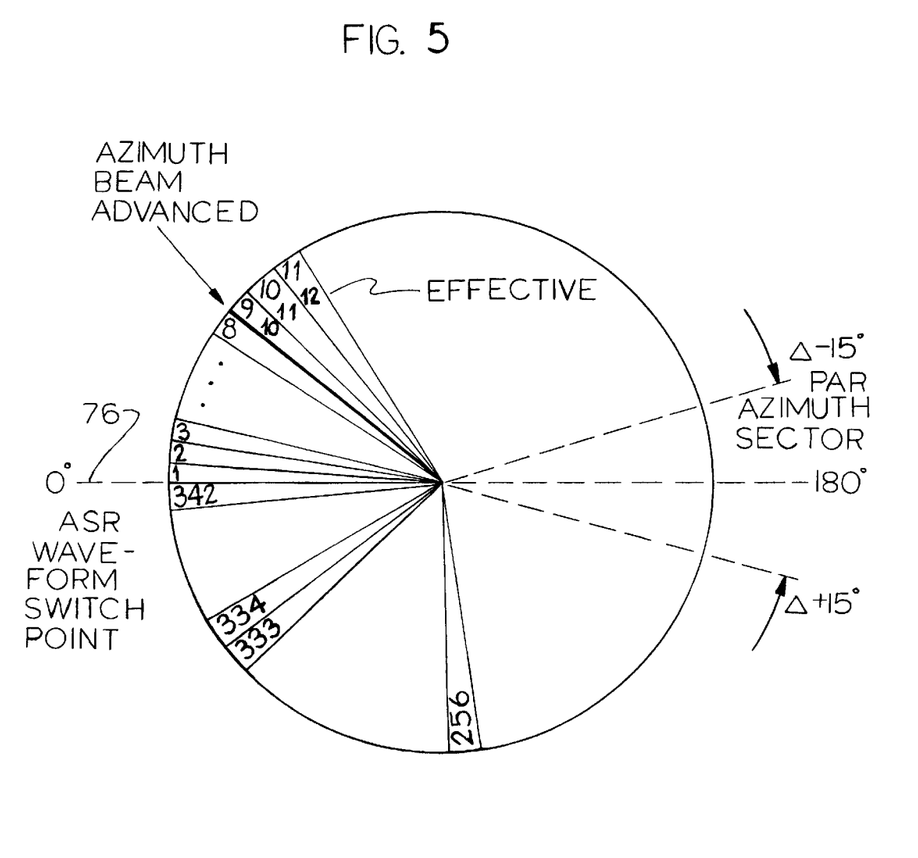
FIG. 5 is a simplified scan diagram (similar to FIG. 2) for an exemplary embodiment.

Design of the ASR waveforms is constrained by the required detection range, target Doppler and available time-on-target. With the azimuth beamwidth (1.05°) of the azimuth antenna essentially matched to the sector rotation angle (1.05°), the time-on-target as the azimuth beam sweeps past the target is approximately 2.916 milliseconds. To increase the effective or total time-on-target for the ASR radar, a different waveform is transmitted on each of five consecutive antenna rotations. A total of five different azimuth antenna ASR waveforms (shown below in Table VI) are used to detect targets at various ranges and Doppler velocities. FIG. 4 shows the azimuth antenna ASR waveform sequence timing of these five waveforms with a different waveform selected each 1 second rotation period of the azimuth antenna 14. On scan 1, waveform WF2000 is selected. Waveforms are switched at ASR waveform switch point 76 identified as the start of sector 1 or 0° (shown in FIG. 5). Waveform WF2001 is selected on scan 2, and so on, until waveform WF2004 is selected on scan 5. Following scan five, a scan counter (not shown) is reset to 1 and the 5 waveform cycle is repeated ad infinitum. While alternate ASR waveforms might also be designed to optimize performance in conditions of heavy rain, the waveform set provided in Table VI provides the required performance for the ASR out to a maximum instrumented range of at least 30 nmi in clear weather.

TABLE VI

Exemplary ASR Waveforms

| Waveform | 2000 | 2001 | 2002 | 2003 | 2004 |
|---|---|---|---|---|---|
| Pulsewidth | 95.7 µs | 95.7 µs | 30.3 µs | 30.3 µs | 1.2 µs |
| Pulse Repetition Interval | 470.4 µs | 474.6 µs | 169.8 µs | 281.4 µs | 78.0 µs |
| No. of Pulses | 0 + 7 | 0 + 7 | 0 + 17 | 0 + 11 | 0 + 19 + 19 |
| Minimum Range | 7.7 nmi | 7.7 nmi | 2.5 nmi | 2.5 nmi | 0.24 nmi |

TABLE VI-continued

Exemplary ASR Waveforms

| Waveform | 2000 | 2001 | 2002 | 2003 | 2004 |
|---|---|---|---|---|---|
| Maximum Range | 30.3 nmi | 30.7 nmi | 11 nmi | 20 nmi | 6 nmi |
| Range Gate | 0.6 µs | 0.6 µs | 0.6 µs | 0.6 µs | 0.6 µs |

Figure 6:
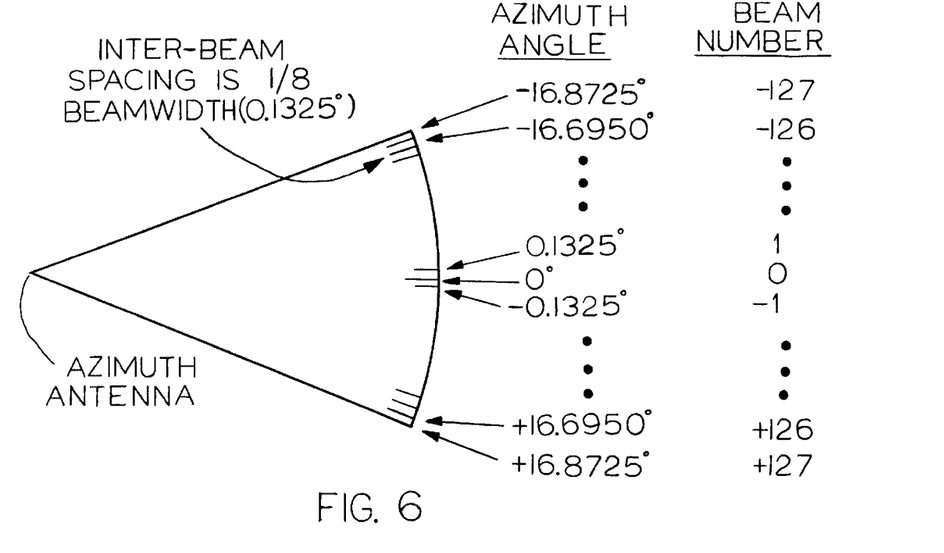
FIG. 6 is a diagram of the subsidiary scan arc as implemented by a plurality of electronically steerable emitters in an exemplary embodiment.

The azimuth antenna 14 is implemented with 255 electronically steerable beam positions in azimuth as shown in FIG. 6. One additional beam position is reserved for the system built-in-test equipment (BITE). Azimuth beam space is spanned by 255 beam positions number −127 to +127 with beam 0 at 0° azimuth. The beam step size is ⅛ of the nominal one-way 1.05° azimuth beamwidth of 0.13125°.

Figure 7:
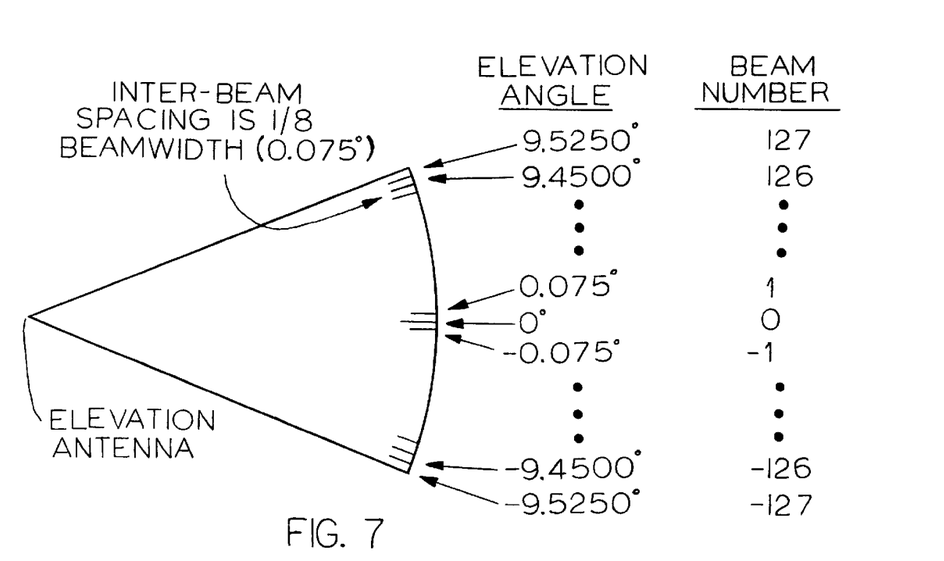
FIG. 7 is a diagram of the scan arc for an elevation antenna implemented by a plurality of electronically steerable emitters in an exemplary embodiment.

FIG. 7 similarly shows the elevation antenna PAR beam position numbering as implemented with an elevation antenna 16 having 255 electronically steerable beam positions. One additional beam position is reserved for system BITE. Elevation beam space is spanned by 255 beam positions numbered −127 to +127 with beam 0 at 0° elevation. The beam step size is ⅛th of the nominal one-way 0.6° elevation beamwidth or 0.075°. The basic elevation antenna PAR beam position number scan sequence consists of 27 beam positions with a half-beamwidth (0.3°) separation. This sequence is shown below in Table VII in the column labeled "27 Elevation Position Scan Program". For the short pulse waveforms (described below), an additional 14 beams are interleaved within the basic scan program beam positions, resulting in a one-fourth beamwidth spacing for this waveform. These additional beams are positioned to be centered as closely as possible to the centroid of the closer of the two designated targets, while still maintaining the one-quarter beamwidth interleave. To illustrate the resultant one-quarter beamwidth spacing, 14 beam positions labeled EL-1 to EL-14 have been inserted in the scan program column centered at +3.0° elevation.

TABLE VII

Exemplary Elevation Scan Sequence

| Elevation Beam Number | 27 Elevation Position Scan Program | Elevation Angle |
|---|---|---|
| −12 | 1 | −0.9000 |
| −8 | 2 | −0.6000 |
| −4 | 3 | −0.3000 |
| 0 | 4 | 0.0000 |
| 4 | 5 | 0.3000 |
| 8 | 6 | 0.6000 |
| 10 | EL-1 | 0.7500 |
| 12 | 7 | 0.9000 |
| 14 | EL-2 | 1.0500 |
| 16 | 8 | 1.2000 |
| 18 | EL-3 | 1.3500 |
| 20 | 9 | 1.5000 |
| 22 | EL-4 | 1.6500 |
| 24 | 10 | 1.8000 |
| 26 | EL-5 | 1.9500 |
| 28 | 11 | 2.1000 |
| 30 | EL-6 | 2.2500 |
| 32 | 12 | 2.4000 |
| 34 | EL-7 | 2.5500 |
| 36 | 13 | 2.7000 |
| 38 | EL-8 | 2.8500 |
| 40 | 14 | 3.0000 |
| 42 | EL-9 | 3.1500 |
| 44 | 15 | 3.3000 |
| 46 | EL-10 | 3.4500 |

TABLE VII-continued

Exemplary Elevation Scan Sequence

| Elevation Beam Number | 27 Elevation Position Scan Program | Elevation Angle |
|---|---|---|
| 48 | 16 | 3.6000 |
| 50 | EL-11 | 3.7500 |
| 52 | 17 | 3.9000 |
| 54 | EL-12 | 4.0500 |
| 56 | 18 | 4.2000 |
| 58 | EL-13 | 4.3500 |
| 60 | 19 | 4.5000 |
| 62 | EL-14 | 4.6500 |
| 64 | 20 | 4.8000 |
| 68 | 21 | 5.1000 |
| 72 | 22 | 5.4000 |
| 76 | 23 | 5.7000 |
| 80 | 24 | 6.0000 |
| 84 | 25 | 6.3000 |
| 88 | 26 | 6.6000 |
| 92 | 27 | 6.9000 |

Figure 8:
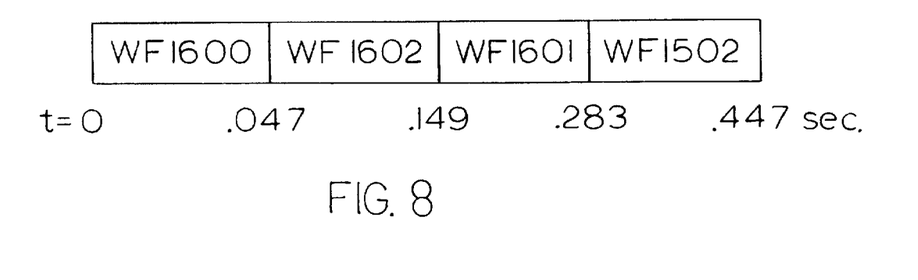
FIG. 8 is simplified timing diagram showing the sequence of different PAR waveforms (selected from a set of four waveforms) emitted by the elevation antenna during each principal arc rotation in an exemplary embodiment.
Figure 9:
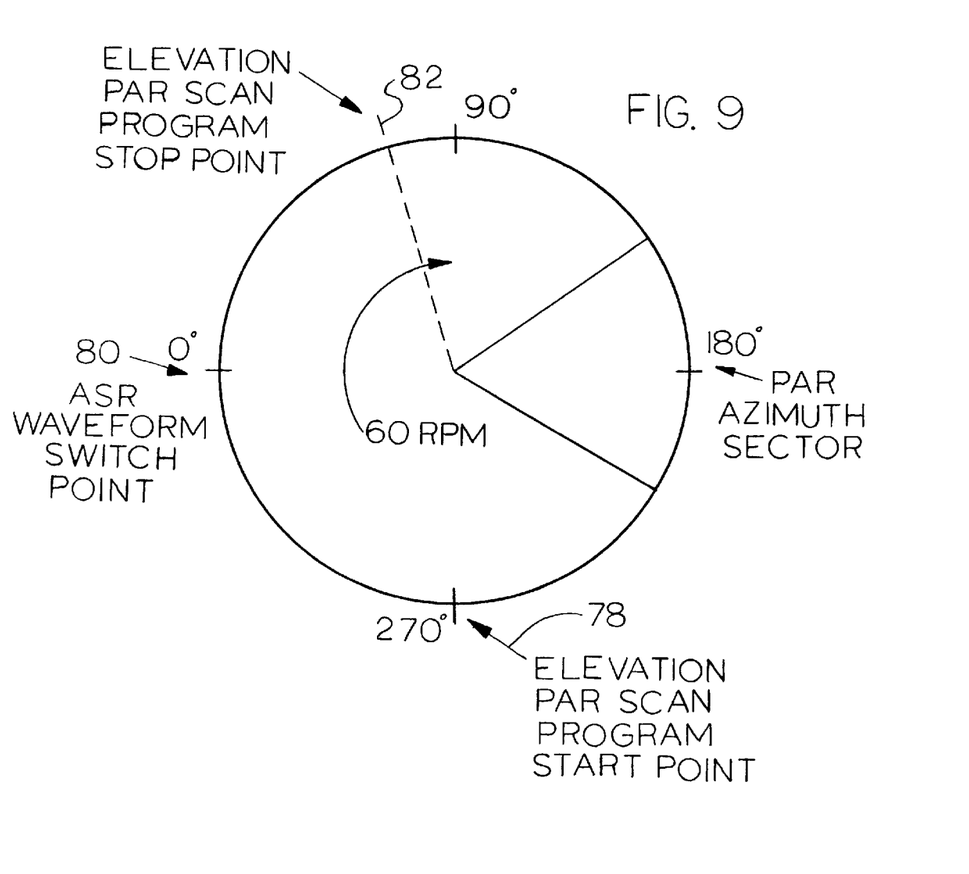
FIG. 9 is simplified scan diagram showing the relationship of the PAR elevation scan sequence to the azimuth scan sequence.

Design of the elevation antenna PAR waveforms is constrained by the required detection range, target Doppler and available time-on-target. A total of four different PAR elevation waveforms (shown below in Table VIII) are used to detect targets at various ranges and Doppler velocities. The sequencing of these four waveforms is shown in FIG. 8. The PAR elevation waveform sequence is initiated by the sweep/sequence controller 32 at point 78 at which the azimuth antenna 14 is 90° prior (in a clockwise rotation sense) to reaching the ASR waveform switch point 80 (see FIG. 9). At the start of the PAR elevation scan, waveform WF1600 is transmitted at each of the 41 (27+14) elevation beam positions. This is followed by transmitting WF1602 at each of the 27 beam positions, and so on until WF1502 has been transmitted at each of the 27 elevation beam positions completing the scan program. This elevation scan program of four waveforms takes approximately 0.447 seconds, so it completes at point 82 shortly before the azimuth antenna 14 rotates to the 90° position when the azimuth antenna is rotated at 60 rpm. While alternate PAR elevation waveforms might also be designed to optimize performance in conditions of heavy rain, the waveform set provided in Table VI provides the performance required for the PAR out to a maximum instrumented range of at least 20 nmi in clear weather.

TABLE VIII

PAR Elevation Waveforms

| Waveform | 1600/A | 1601/A | 1602/A | 1502/A |
|---|---|---|---|---|
| Pulsewidth | 0.6 μs | 18.9 μs | 40.5 μs | 40.5 μs |
| Pulse Repetition Interval | 72.0 μs/ 74.4 μs | 108.0 μs/ 110.4 μs | 180.0 μs/ 182.4 μs | 289.8 μs/ 292.2 μs |
| No. of Pulses | 4 + 12 | 2 + 11 + 11 + 11 + 11 | 1 + 11 + 11 | 1 + 10 + 10 |
| Minimum Range | 0.1 nmi | 1.5 nmi | 3.2 nmi | 3.2 nmi |
| Maximum Range | 5.5 nmi | 7.2 nmi | 11.1 nmi | 20.0 nmi |
| Range Gate | 0.3 μs | 0.3 μs | 0.3 μs | 0.3 μs |

TABLE IX

Exemplary Combined Mode Azimuth Waveforms

| Waveform | 1100CM | 1101CM | 1102CM | 1002CM |
|---|---|---|---|---|
| Pulsewidth | 0.6 μs | 18.9 μs | 40.5 μs | 40.5 μs |
| Pulse Repetition Interval | 72.0 μs/ 74.4 μs | 108.0 μs/ 110.4 μs | 180.0 μs/ 182.4 μs | 289.8 μs/ 292.2 μs |
| No. of Pulses | 20 | 26 | 16 | 10 |
| Minimum Range | 0.1 nmi | 1.5 nmi | 3.2 nmi | 3.2 nmi |
| Maximum Range | 5.5 nmi | 7.2 nmi | 11.1 nmi | 20.0 nmi |
| Range Gate | 0.3 μs | 0.3 μs | 0.3 μs | 0.3 μs |

The azimuth antenna PAR Combined Mode (CM) waveforms are shown above in Table IX. In the combined mode, since the designated target's range and Doppler are determined by the tracker 38 based on the PAR elevation waveform track history, it is not necessary to transmit more than a single waveform type each rotation of the azimuth antenna 14 to accurately illuminate the target in azimuth as the target varies in range and Doppler. Instead, the appropriate combined mode azimuth waveform from Table IX is selected by the tracker 38 by observing the corresponding PAR elevation waveform from Table VIII which is currently producing the target return with the greatest signal/noise ratio. Since the pulse width and pulse repetition interval for a waveform uniquely establish both its range and Doppler coverage and since the corresponding waveforms in Tables VIII and IX have identical pulse widths and pulse repetition intervals (PRI), i.e., WF1600 and WF1100CM each have identical pulse width and PRI, it follows that for each pair of waveforms, targets detected by the elevation antenna can be detected by the azimuth antenna 14 using the corresponding combined mode azimuth waveform.

Figure 10:
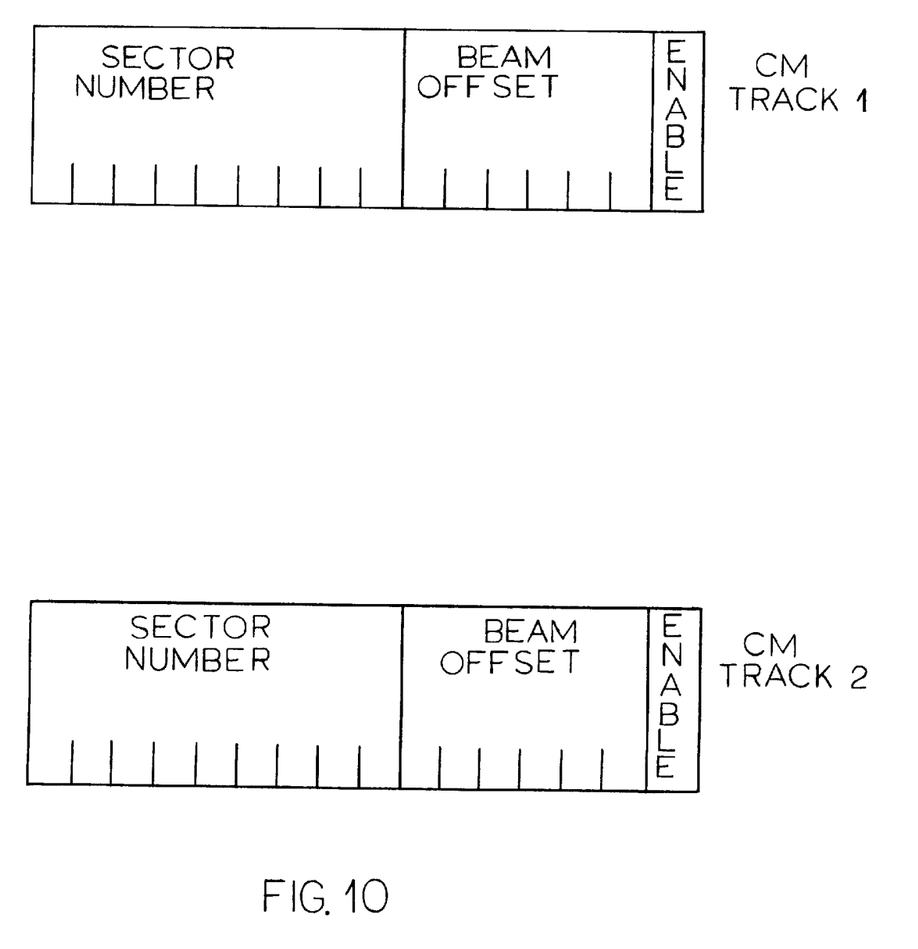
FIG. 10 is a bit description of control words used by the tracker to instruct the sweep/sequence controller of the location of tracked targets.

Azimuth antenna PAR azimuth waveforms in combined mode, referred to here as CM waveforms, occur for a duration which has been selected to be about 3.25 sectors which equals 364 ACPs or 9479 us. A single designated target therefore takes four ASR sectors to service which includes extra time for fill pulses when repositioning the azimuth emitter 40 to recommence emitting ASR waveforms. Alternatively, two designated targets or tracks can be serviced back-to-back for a total time requirement of 6.5 sectors (requiring 7 ASR sectors to include some extra time for fill pulses when repositioning the azimuth emitter 40 to emit the ASR waveforms). The control of the two combined mode tracks is provided by two 16-bit control words sent to the sweep/sequence controller 32 by the tracker 38 via path 84 as CM control words (see FIG. 10). Each CM control word (one for each tracked target) specifies a 9-bit sector number, a 6 bit beam offset, and a 1 bit enable. The sector number corresponds to the ASR sector number which normally ranges from 1 to 334 without CM waveform tracks.

The operation of a single CM track is discussed first. Ideally, the center of the CM waveform should coincide with the point where the beam normal of the rotating antenna lines up with the center of the target in track. Since the CM waveforms are started on a sector boundary, it is only possible to do this with a granularity of 1 sector. To align the center of the target with the center of the CM waveform with finer granularity, the beam offset in the CM Control Word has been provided, which provides a range of −32 (−8 beamwidths) to +31 (+7.75 beamwidths) in ¼ beam increments. The sector number and beam offset in the CM control word can be selected using the following steps:

(1) The true azimuth of the target is subtracted from the true azimuth of the ASR waveform switch point (modulo 360°).
(2) The result from (1) is converted to ACPs. [38400×(result/360)]
(3) Subtract 50 ACPs from (2) and divide by 112 to arrive at the sector where the center of the target will be.
(4) The sector number in the CM control word actually represents the last ASR sector before the CM waveform, so 2 ACPs should be subtracted from the result from (3). The remainder from (3) can be used to determine the beam offset as suggested by the following table biased by 10 ACPs to compensate for the fill pulses immediately preceding the CM waveforms:
0–23: −2 (−½ beamwidth)
24–51: −1 (−¼ beamwidth)
52–79: 0
80–107: +1 (+¼ beamwidth)
108–111: +2 (+½ beamwidth)

The sector number sent in the CM control word generates a compare in the sweep/sequence controller 32 which causes the CM waveform to begin on the next sector boundary. This last ASR sector is allowed to complete with a full set of PRIs irrespective of the start of the next sector which will start the CM waveform, so this adds as much as a PRI of uncertainty as to when the CM waveform actually begins following the sector boundary. This amount of uncertainty in positioning the start of the CM waveform is minimized since the CM waveform is considerably wider than the azimuth arc size of the target and the ACP count combined with the beam number in the collected data will provide the required measurement accuracy.

After the CM waveform completes, the sweep/sequence controller 32 decrements the ASR beam count by exactly 4 beamwidths using the subsidiary arc positioner 42. During the ASR waveforms, the ASR beam count is effectively incremented by 1/32 beamwidth every sector so that every 8$^{th}$ sector sees a beam increment of ¼ beamwidth, except during the CM waveform during which the counter is not incremented. The lower 3 bits of this counter are not used external to the sweep/sequence controller 32. Since the counter is decremented by 4 beamwidths following the CM waveform, the lower 3 internal bits of this counter are retained. Consequently, when the ASR waveforms resume following a CM waveform, the sectors within the scan which normally see a ¼ beamwidth change are the same. At 180° from the ASR waveform switch point 76, the ASR beam count is positive by about 5 beamwidths, so the count will be reduced to almost zero following a single CM waveform and it could be negative if the CM waveform is started at an earlier sector. The fractional sector which follows a CM waveform, which is 3.25 sectors, provides for fill pulses for the ASR waveform at the newly established ASR beam number. The return to emitting ASR waveforms is not synchronized to sector boundaries but conforms to all of the rules of the normal ASR scan. The sector number (normally 1 to 334 if there are no CM tracks) advances by 4 during the CM waveform so other controls which use sector number (such as emission gates and test targets) must be compensated for if they follow a CM waveform. Alternatively following two tracks, the sector number increases by either 7 or 8.

Table X below shows exemplary pulse sequences for each of the four potential combined mode waveforms:

TABLE X

Exemplary Combined Mode Waveform Sequences

| Waveform Number | | | |
|---|---|---|---|
| 000000 | 1100CM | (4 fill pulses) | 276 us |
| 000001 | 1100CM | (CPI A - 44 pulses) | 3036 us |
| 000010 | 1100CM | (CPI B - 44 pulses) | 3036 us |
| 000011 | 1100CM | (CPI C - 44 pulses) | 3036 us |
| | | | 9384 us |
| 000100 | 1101CM | (2 fill pulses) | 210 us |
| 000101 | 1101CM | (CPI A - 29 pulses) | 3045 us |
| 000110 | 1101CM | (CPI B - 29 pulses) | 3045 us |
| 000111 | 1101CM | (CPI C - 29 pulses) | 3045 us |
| | | | 9345 us |
| 001000 | 1102CM | (2 fill pulses) | 354 us |
| 001001 | 1102CM | (CPI A - 17 pulses) | 3009 us |
| 001010 | 1102CM | (CPI B - 17 pulses) | 3009 us |
| 001011 | 1102CM | (CPI C - 17 pulses) | 3009 us |
| | | | 9381 us |
| 010000 | 1002CM | (2 fill pulses) | 573.6 us |
| 010001 | 1002CM | (CPI A - 10 pulses) | 2868 us |
| 010010 | 1002CM | (CPI B - 10 pulses) | 2868 us |
| 010011 | 1002CM | (CPI C - 10 pulses) | 2868 us |
| | | | 9177.6 us |

The second track gate can be serviced in one of two ways: 1) separately or 2) back-to-back. Separate tracks consume 4 sectors each for a total of 8 within the scan, whereas back-to-back tracks consume 7 consecutive sectors total. If serviced separately, the same process for determining the sector number and beam offset previously described above apply. The sector number for the second track must be at least offset 5 sectors from the first. For a sector difference of 5 between the two tracks one ASR sector of collected data will be inserted between the two CM waveforms.

Since the beam normal position of back-to-back tracks are offset by about 3.25 beamwidths and the beam offset can range from −8 to −7.75 beamwidths, a track separation of 19 beamwidths can be accommodated with back-to-back servicing. Rather than selecting the first track to assume the beam normal position and the second to have a several beamwidth offset, it is preferred to balance the beam offsets between the two tracks and place the two back-to-back CM waveforms so they are centered about the midpoint between the two tracks. A procedure for doing this is suggested below:

(1) If the two tracks are separated by less than a certain amount (10 or more beamwidths), process back-to-back, otherwise process separately as above.
(2) Find the midpoint between the two tracks in true azimuth.
(3) Subtract the true azimuth of the ASR waveform switch point from the result in (2), modulo 360°.
(4) The result from (3) is converted to ACPs. [38400×(result/360)]
(5) Subtract 50 ACPs from (4) and divide by 112 to arrive at the sector where the midpoint of the two targets will be.
(6) The sector number in the CM control word actually represents the last ASR sector before the first CM waveform, so 4 ACPs should be subtracted from the result from (5). This value should be placed in the CM control word of the first track, and this value+1 ACP should be placed in the CM control word of the second track.

(7) The remainder from (5) can be used along with the difference (D) between the two tracks to arrive at the beam offsets. Convert the difference D into beamwidths, wherein:

Track 1 Offset=1.6 beamwidths−D/2+(table above using remainder)

Track 2 Offset=−1.6 beamwidths+D/2+(table above using remainder)

Since only 7 sectors are used for back-to-back track servicing, the ASR beam count is decremented by 7 beamwidths before recommencing the emission of ASR waveforms. In this case, the ASR beam number will most likely be negative but will turn positive prior to the end of the ASR sweep which will end with sector number 341. The ¼ beam increments in ASR will occur at the same locations in the sweep as they would without the track gate servicing.

Although the present invention has been described in detail with reference only to the presently-preferred embodiments, those of ordinary skill in the art will appreciate that various modifications can be made without departing from the invention. For example, while a scan sequence has been shown where a PAR waveform sequence is emitted prior to an ASR waveform sequence at their common rotational positions, one of ordinary skill in the art can envision the opposite or other sequences that result in an equivalent result. Additionally, while a structure has been described where the principal arc positioner 44 physically moves the azimuth emitter 40 to scan the principal arc, embodiments that use a plurality of azimuth emitters 40, sufficient to electronically scan the full 360° principal arc are also considered to be within the scope of the present invention. Accordingly, the invention is defined by the following claims.

We claim:

1. A radar system suitable for use at an airport site proximate to a runway for producing data signals representing (1) air surveillance information indicative of aircraft within a 360° azimuth space around said site and (2) precision approach information indicative of the elevation and azimuth of aircraft within a portion of said 360° azimuth space centered on said runway, said system comprising:

a radar head having an azimuth antenna portion for directionally radiating a source beam in a first direction and for receiving a reflected beam in response thereto;

a principal scan apparatus coupled to said azimuth antenna portion for scanning said source beam radiation at an essentially constant rate through a principal scan rotation corresponding to said 360° azimuth space;

a subsidiary scan apparatus coupled to said azimuth antenna portion for varying the direction of said source beam during each said principal scan rotation;

a sequence controller for periodically initiating said principal scan rotation and said subsidiary scan within each said principal scan rotation; and a signal generator for applying an air surveillance source signal and a precision approach source signal to said azimuth antenna portion during a selected portion of each said principal scan rotation.

2. The radar system of claim 1 wherein said principal scan apparatus causes said azimuth antenna portion to mechanically rotate through said 360° principal scan rotation at an essentially constant rate.

3. The radar system of claim 1 wherein said azimuth antenna portion is comprised of a plurality of beam emitters for generating said source beam and said subsidiary scan apparatus periodically deflects said source beam relative to a beam normal position defined by said azimuth antenna portion.

4. The radar system of claim 1 wherein said source beam is radiated in a direction dependent on rotational azimuth positions defined by said principal and said subsidiary scan apparatus and wherein said subsidiary scan apparatus periodically causes said source beam direction to lead said rotational azimuth position defined by said principal scan apparatus.

5. The radar system of claim 1 wherein said subsidiary scan apparatus causes said source beam to rescan a selected portion of said 360° azimuth space.

6. A timeshared radar system comprising:

an antenna having an azimuth antenna portion for radiating a source beam therefrom in a beam normal direction and for receiving target reflected beams responsive thereto;

a principal scan apparatus for repeatedly scanning said azimuth antenna portion through a principal azimuth scan of 360° at an essentially constant rate;

a control apparatus for deflecting said source beam through a subsidiary azimuth scan of less than ±90° relative to said beam normal direction during a subsidiary portion of each said principal azimuth scan; and a signal source for selectively applying a first signal to said azimuth antenna portion to produce an ASR source beam suitable for long range aircraft surveillance and a second signal to said azimuth antenna portion to produce a PAR source beam suitable for precision aircraft tracking.

7. The timeshared radar system of claim 6 wherein said control apparatus causes said source beam to rescan a selected portion of said principal azimuth scan by periodically deflecting said source beam during said subsidiary portion of each said principal azimuth scan.

8. The timeshared radar system of claim 7 wherein said azimuth antenna portion emits said ASR and said PAR source beams at said selected portion of said principal azimuth scan.

9. The radar head of claim 6 wherein said control apparatus electronically causes said source beam to be positioned within said subsidiary portion of each said principal azimuth scan.

10. The radar head of claim 6 wherein said control apparatus mechanically causes said azimuth antenna portion to scan through said principal azimuth scan.

11. The radar head of claim 6 wherein said azimuth antenna portion includes a plurality of emitters having outputs phased to form said source beam and wherein said control apparatus controls said emitter outputs to cause said source beam to be positioned within said subsidiary portion of each said principal azimuth scan.

12. The radar head of claim 6 wherein said control apparatus periodically causes said source beam to deflect in a first direction at an essentially constant rate throughout said principal azimuth scan.

13. The radar head of claim 12 wherein said control apparatus periodically alters where said source beam deflects in said first direction along said principal azimuth scan.

14. The radar head of claim 12 wherein said control apparatus causes said source beam to deflect in a second direction opposite said first direction for a selected number of times throughout said principal azimuth scan.

15. The radar head of claim 6 wherein said principal scan apparatus causes said azimuth antenna portion to rotate at an essentially fixed rate of approximately sixty revolutions per minute (rpm).

16. A method of timesharing a radar head having an azimuth antenna portion, said method comprising the steps of:
- continuously directing said azimuth antenna portion by rotating said azimuth antenna portion at an essentially constant rate along a 360° principal azimuth scan;
- emitting a first source signal and receiving a reflected signal from a target;
- periodically directing said azimuth antenna portion to emit said first source signal within a subsidiary azimuth scan in advance of said principal azimuth scan to result in an effective rotational azimuth position defined by the sum of positions within said principal and subsidiary azimuth scans;
- periodically emitting a second source signal and receiving a reflected signal at a first effective rotational azimuth position corresponding to a prescribed target;
- periodically retarding a current effective rotational azimuth position and causing said azimuth antenna portion to emit said first source signal within said subsidiary azimuth scan following said second source signal emission, said retarding sufficient to reposition said azimuth antenna portion at said first effective rotational azimuth position.

17. The method of claim 16 wherein said periodically directing step occurs at an essentially constant rate throughout said principal azimuth scan.

18. The method of claim 17 wherein said periodically directing step periodically alters where said periodically directing step occurs along said principal azimuth scan.

19. The method of claim 16 wherein said periodically retarding step occurs a selected number of times within said principal azimuth scan.

20. The method of claim 17 wherein said periodically directing step periodically alters where said periodically directing step occurs along said principal azimuth scan.

21. The method of claim 16 wherein said periodically directing step occurs by electronically altering phased outputs of a plurality of emitters which comprise said azimuth antenna portion.

22. The method of claim 16 wherein said azimuth antenna portion is mechanically rotated at an essentially constant rate of approximately sixty revolutions per minute (rpm).

* * * * *